Jan. 25, 1966     K. SCHMUTZ ETAL     3,231,759

TRANSISTORIZED STAIRCASE VOLTAGE DERIVATION CIRCUIT

Filed Dec. 13, 1962     2 Sheets-Sheet 1

INVENTORS:
KARL SCHMUTZ AND
PIERRE PREBANDIER
BY: McGlew and Toren
ATTORNEYS

INVENTORS:
KARL SCHMUTZ AND
PIERRE PREBANDIER
BY: McGlew and Toren
ATTORNEYS

United States Patent Office 3,231,759
Patented Jan. 25, 1966

3,231,759
TRANSISTORIZED STAIRCASE VOLTAGE DERIVATION CIRCUIT
Karl Schmutz and Pierre Prebandier, Zurich, Switzerland, assignors to Albiswerk Zurich A.G., Zurich, Switzerland
Filed Dec. 13, 1962, Ser. No. 244,500
Claims priority, application Switzerland, Dec. 15, 1961, 14,544/61
10 Claims. (Cl. 307—88.5)

This invention relates to pulse radar apparatus and, more particularly, to a novel circuit arrangement for deriving a staircase voltage from amplitude modulation of the echo or received signals.

Automatic tracking by means of radar is effected by moving the radar beam in circles, such movement being effected, in a known manner, either by movement of the primary radiator alone, by movement of the reflector alone, or by a combined movement of the primary radiator and the reflector.

Usually the radar beam diverges from the axis of symmetry of the reflector by a small angle, of the order of one degree. Due to the rotary movement, the principal axis of the radiator describes a cone about the axis of symmetry and having an apex at the center of the reflector. Unless the target is directly on the axis of symmetry, the impingement of the radar beam thereupon varies so that the amplitude of the echo signal changes constantly. The amplitude difference is a measure of the error, and can be used for controlling the radar to automatically track the target.

An effective way for deriving a control voltage for providing the automatic tracking is to use the modulation of the echo signals, caused by the rotating radiation characteristic, to derive a staircase voltage, and to use this staircase voltage to provide the control signal for automatic tracking.

A principal object of the present invention is to provide a novel circuit arrangement for deriving a staircase voltage corresponding to the amplitude modulation of the echo signals.

Another object of the invention is to provide such a circuit which can be used either with vacuum tubes or with transistors.

Still a further object of the invention is to provide such a circuit which provides the same quality as known circut arrangements, used for the same purpose, and which known circuits employ only vacuum tubes.

The conversion of the amplitude modulated echo pulses into a staircase voltage can be easily effected with vacuum tube circuitry, as the high blocking resistances of the vacuum tubes are sufficient to maintain the charge on a charging condenser for a considerable period. However, it has hitherto not been possible to derive a staircase voltage from the amplitude modulated echo pulses using only transistors, as such an arrangement is very expensive and is still not equivalent in quality to a vacuum tube circuit.

In accordance with the present invention, there is provided a staircase voltage derivation circuit employing transistors, and which may be used either with vacuum tubes or with transistors to produce a staircase voltage with the same quality as known vacuum tube circuit arrangements.

More specifically, in accordance with the present invention, a pulse which has an amplitude proportional to the amplitude of the echo pulse is derived from the echo pulse after a delay effected by a distance gating circuit, and is used to charge the condenser. A blocking oscillator, whose output pulse has a polarity opposite to that of the proportional pulse, is excited by the trailing flank of the gated pulse, and such output pulse is used to effect the complete discharge of the condenser, and recharging of the condenser, after such discharge, to the instantaneous value of the proportional pulse which coincides in time with the trailing flank of the gate pulse.

For an understanding of the principles of the invention, reference is made to the following description of a typical embodiment thereof as illustrated in the accompanying drawings.

Figure 1:
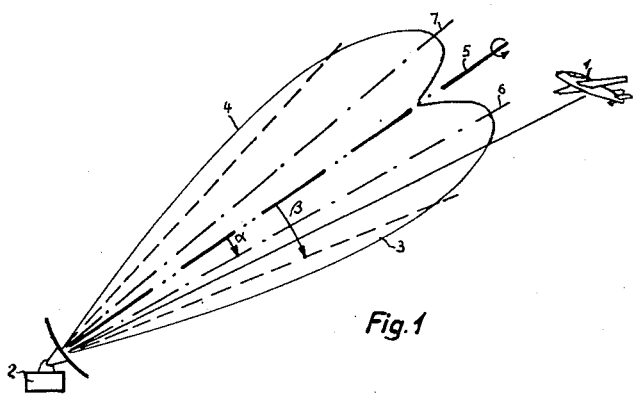
FIG. 1 is a schematic illustration of the radiation pattern of a rotating radar device used in tracking a target, in two extreme positions.

Referring to FIG. 1, a target 1 is illustrated as being tracked by a radar apparatus 2. The envelopes 3 and 4 illustrate the rotating radiation characteristic in two extreme positions, such as at 180° to each other. It is assumed that the radiation characteristic is rotating at about 30 r.p.m. about the axis of symmetry 5. The principal axis of the radiation envelope 3 is designated at 6, and that of the radiation envelope 4 is designated 7. For the sake of clarity, both the angle of deflection $\alpha$ and the extreme angle $\beta$ of the characteristic have been shown as greatly enlarged.

Figure 2:
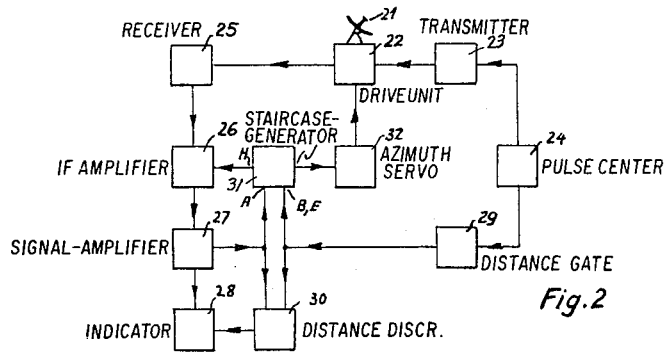
FIG. 2 is a simplified block diagram of the radar apparatus illustrated in FIG. 1.

Referring to FIG. 2, antenna 21 of the radar apparatus is rotated by the drive unit 22. The high frequency output or transmitting pulses are produced in a transmitter 23 at the frequency of a pulse sequence from the pulse center 24. The reflected or echo pulses arrive at the receiving stage 25 where they are used to modulate an intermediate frequency carrier. These echo or reflected signals are amplified in the intermediate frequency amplifier 26, and a signal amplifier 27 demodulates and amplifies the echo pulses to control the indicator 28.

Simultaneously with the production of each transmission triggering pulse, and after a delay interposed by a distance gating circuit 29, there is provided a distance gate pulse which is delivered, on one hand, to the distance discriminator 30 for distance follower control and, on the other hand, to the staircase voltage generator 31. In the staircase generator 31, a voltage for regulating the amplification is derived from the modulations of the echo signals caused by the rotating radiation characteristic, so that the radar pictures in the indicator 28 are uniformly illuminated. The modulation itself is applied to an angular deviation device 32 which produces the control signals for the drive unit 22 to provide the automatic tracking of the target.

Figure 3:
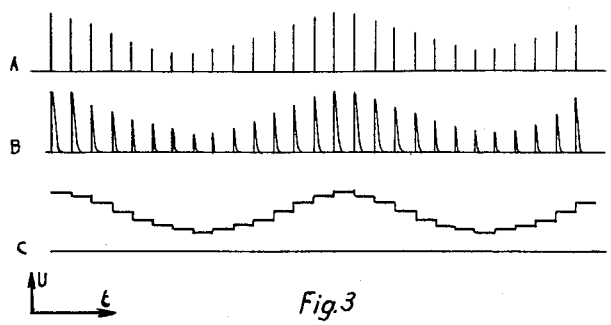
FIG. 3 is a series of curves graphically illustrating the derivation of the staircase voltage.

The operation of the staircase generator 31 will be understood best by reference to FIG. 3, in which the voltage curves are labelled to correspond with the input and output connections of the staircase generator 31 of FIG. 2. In this figure, the ratio of the pulse repetition frequency PF to the modulation frequency MF has been deliberately chosen at a value substantially below normal, such as a value of 15 instead of a value of the order of 50. In known radar devices of this type, the demodulated and amplified echo signals illustrated in FIG. 3A are applied, after traveling through a distance gate circuit and additional amplifiers, to a circuit for extending the echo signals as shown in curve A1 of FIG. 3. The pulse extension circuit has a short charging time constant of 0.1 μs. and a longer discharge time constant of about 10 μs. The extended pulses are applied to a controlled switching stage, usually known under the term "boxcar circuit."

The control pulses are produced from the trailing flank of the distance gate pulse, through the medium of a blocking oscillator, and are applied to the winding of a transformer. Condensers connected to the transformer winding are charged when the control pulses disappear, and these thus block the control electrode of the switching stage or boxcar circuit. The next control pulse discharges the condenser so that the switching stage is re-energized. After this pulse, the condenser are recharged to block the switching stage.

During the conductive period of the switching stage or boxcar circuit, the potential of the extended echo pulse is applied to a charging condenser which, because of a high discharge time constant, stores such potential until the arrival of the next switching pulse. The potential of this next switching pulse is again applied to the charging condenser, which is immediately recharged to the new potential. In this manner, a staircase voltage is derived at the output of the charging condenser, as represented by the curve H of FIG. 3.

It should be noted that in FIG. 3, the voltage amplitude U is indicated in a vertical direction and the time $t$ in a horizontal direction, as will be seen from the arrows at the lower corner of the figure.

Figure 4:
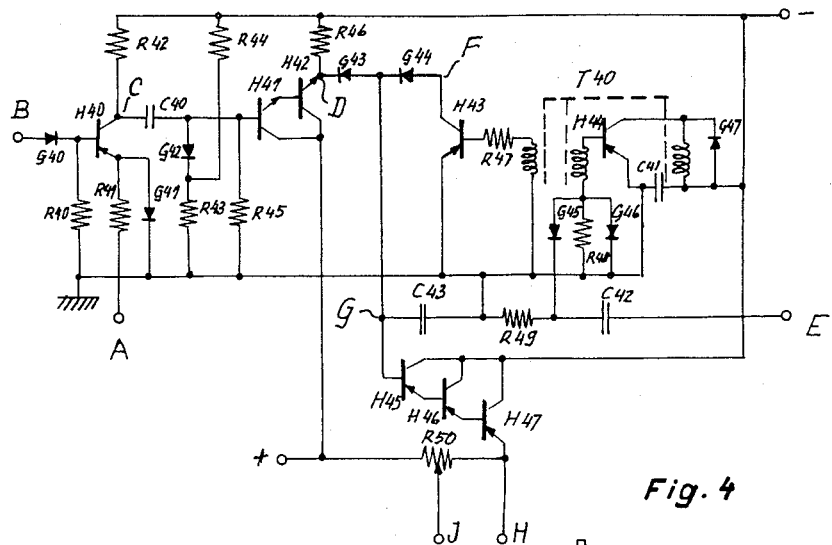
FIG. 4 is a schematic wiring diagram of the novel staircase voltage derivation circuit embodying the present invention.
Figure 5:
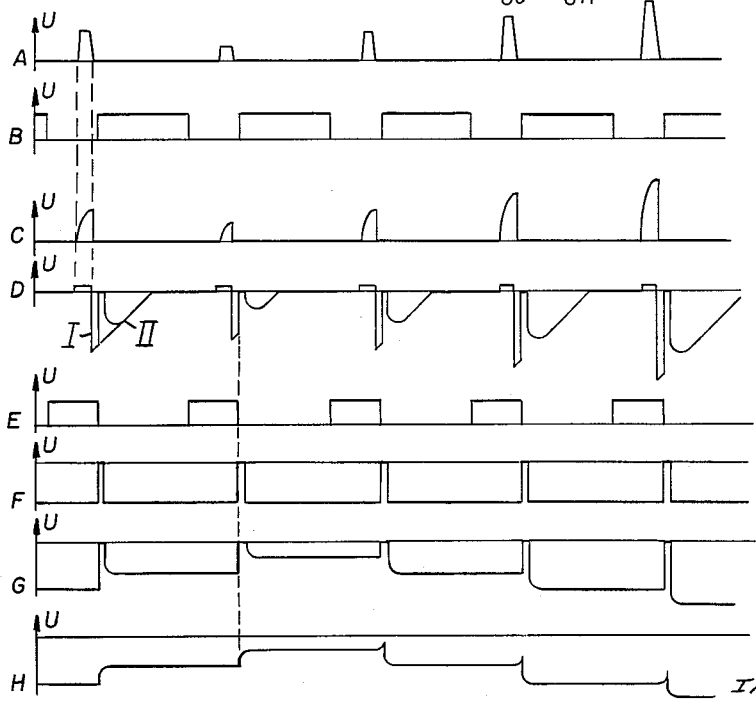
FIG. 5 is a series of curves, similar to FIG. 3 but to a widened scale and with additional wave forms, schematically illustrating the operation of the circuit of FIG. 4.

Referring to FIG. 4, the staircase generator 31 of the invention shown therein has the same input and output connections as that shown in FIG. 2. The echo signal is fed at the input A, the negative distance gate pulse at the input B, and the positive distance gate pulse at the input E. The two outputs H and J direct the modulation voltage to the intermediate frequency amplifier 26 and to the angular deviation device 32, respectively. The other points labeled C, D, F, G are measuring points whose voltage curves are represented in the curve of FIG. 5.

Through the medium of a diode G40 with a steep characteristic, the negative distance gate pulses at the input B are applied to the base of the transistor H40, which is thus triggered conductive. Between two distance gate pulses, the base of transistor H40 is maintained at ground potential through the resistor R40. The echo pulses, delivered at the input A, are applied to the emitter of transistor H40 through the resistor R41, and the amplitude is limited by means of the diode G41.

The collector resistance R42 has a value such that the charging time constant of the condenser C40 is about 0.05 μs., so that condenser C40 is charged to the peak value of each echo pulse, acting as a peak value rectifier. Voltage divider R43–R44 applies a slight negative bias to diode G42 to maintain the low charging time constant for the condenser C40. The time constant for the slow discharge is determined by the condenser C40 and by the resistance R45. In the embodiment of the invention illustrated in FIG. 4, it is assumed that this discharge time is 30 μs. This circuit is usually called a pulse extension circuit. The voltage at the output of the condenser is applied to the base of transistor H41 which, together with transistor H42, forms a two-stage emitter follower, so that the discharge circuit of the condenser is only slightly loaded for electrostatically measuring peak values. At the output D of the two-stage emitter follower, there appear the negative pulses whose peak amplitudes are proportional to the peak amplitudes of the echo signal, as shown in FIG. 5D.

Positive distance gate pulses arriving at the input E are applied through coupling condenser C42 to the base of transistor H44 of the blocking oscillator T40. The design of such a blocking oscillator, which uses a diode trigger G45, is generally known to the art. In order to increase the sensitivity of response, a grounded diode G46 is connected to the base of the transistor. The positive gate pulses are represented by the curves E of FIG. 5, and the pulses generated by the blocking oscillator are represented by the curves F of FIG. 5.

The charging condenser is acted upon by the two pulse forms respectively shown in curve D and curve F of FIG. 5. The crevasse in the impulse of the curve of FIG. 5D is produced by the feedback of the blocking oscillator pulse to the emitter of the transistor H42. This negative pulse charges the charging condenser C43 through the diode G43. After gating of the next echo pulse, a blocking oscillating pulse is generated by the trailing flank of the positive distance gate pulse, and this blocking oscillator pulse is amplified by transistor H43 and discharge condenser C43 through the diode G44. For a rapid discharge, transistor H43 must be overloaded. In order to make the leading flank of the blocking oscillator pulse as steep as possible, base resistance R47 has no capacitive bridge or shunt.

As a result of the discharge of condenser C43 at the end of the distance gate pulse, the resulting voltage at the charging condenser is slightly lower than the peak amplitude of the echo signal as measured at the point D. According to curve D of FIG. 5, the charging amplitude is that represented at point II rather than that at point I. By a corresponding selection of the amplification factor of transistor H40, the amplitude at the point II can be made equal to the peak amplitude of the echo signal.

The voltage of the charging condenser C43 is shown in curve G of FIG. 5. In order to keep the discharge rate of condenser C43, due to the inverse currents of the transistors, as low as possible, the voltage is derived at the output of a three-stage emitter follower amplifier. This emitter follower amplifier comprises the transistors H45, H46 and H47. By using transistors having a low limiting frequency, such as transistors of type OC465, for example, the three-stage emitter follower follows only the relatively slow charge variations of condenser C43 so that undesired discharge impulses on the emitter of transistor H47 are negligibly small.

The control voltage for the amplifier is tapped directly from the emitter of transistor H47. The circuit displaces the phase of the modulation voltage by about −3°. This phase displacement must be taken into account in the control circuit for automatic regulation of the amplification.

The angular deviation voltage is derived at the output J through the adjustable resistance R50, so that the transmission of the impedance to the tracking system of the antenna drive can be regulated.

While a specific embodiment of the invention has been shown and described in detail, to illustrate the application of the principles of the invention, it will be understood that the invention may be embodied otherwise without departing from such principles.

What is claimed is:

1. In pulse-radar devices wherein the peak value of each echo pulse, delayed by a distance gate pulse, is stored in a condenser until arrival of the next pulse, and including a distance gate supplying distance gate pulses, a circuit arrangement for deriving a staircase voltage from the amplitude modulation of the echo pulses comprising, in combination, a transistor having at least three electrodes; means applying the gating pulses to one electrode and the echo pulses to a second electrode of said transistor; means, including a pulse extension circuit having an output and connected to a third electrode of said transistor, operable to derive, from arriving echo pulses, a proportional output pulse having an amplitude proportional to the amplitude of the respective echo pulse; a condenser; means for applying the proportional pulses to charge the condenser; a transistorized blocking oscillator including a transistor, having base and emitter electrodes, having an output and providing an output pulse with a polarity opposite that of the proportional pulse; trigger circuit means for exciting said blocking oscillator with the trailing flank of the gated pulse; transistor amplifier means applying the output pulse of the blocking oscillator to discharge said condenser; and means for recharging the condenser, after such discharge, to the instantaneous value of the proportional pulse and coinciding in time with the trailing flank of the gated pulse.

2. In pulse-radar devices, a staircase voltage derivation circuit as claimed in claim 1, in which the means for deriving the proportional pulse includes a peak value rectifier; means for measuring said peak value electrostatically; and means for subsequently amplifying said peak value.

3. In pulse-radar apparatus, a staircase voltage derivation circuit as claimed in claim 2, in which said means for electrostatically measuring said peak value comprises a two-stage emitter follower transistor amplifier.

4. In pulse-radar apparatus, staircase voltage derivation means as claimed in claim 1, in which said pulse extension circuit has an output, and, including diode means coupling the output of the pulse extension circuit and the output of said blocking oscillator.

5. In pulse-radar apparatus, a staircase voltage derivation circuit as claimed in claim 1, in which said blocking oscillator includes a transistor amplifier.

6. In pulse-radar apparatus, a staircase voltage derivation circuit as claimed in claim 5, including a diode in the triggering circuit of said blocking oscillator.

7. In pulse-radar apparatus, a starcase voltage derivation circuit as claimed in claim 6, including a diode in the base-emitter circuit fo the transistor of said blocking oscillator to maintain the base-emitter voltage at a substantially constant value.

8. In pulse-radar apparatus, a staircase voltage derivation circuit as claimed in claim 1, including a three-stage emitter follower transistor amplifier connected to said condenser to derive the staircase voltage.

9. In radar apparatus, a staircase voltage derivation circuit as claimed in claim 8, in which the transistors of said three-stage emitter follower amplifier have a low limiting frequency.

10. In pulse-radar apparatus of the type wherein the peak value of each echo pulse is stored in a condenser until the arrival of the next pulse, a staircase voltage derivation circuit comprising, in combination, a transistor having at least three electrodes; means applying the echo pulses to one electrode of said transistor; means, connected to a second electrode of said transistor, for deriving, from each echo pulse, a proportional pulse having an amplitude proportional to the amplitude of the respective echo pulse, a condenser; a transistorized blocking oscillator in the charging circuit of the condenser; a distance gating pulse circuit connected to a third electrode of said transistor; trigger circuit means exciting said oscillator with the trailing flank of each gating pulse to produce a blocking oscillator output pulse having a polarity opposite to that of said proportional pulse; transistor amplifier means applying said blocking oscillator output pulse to said condenser to discharge the same; and means for recharging said condenser, immediately after said discharge, to the instantaneous value of the proportional pulse coinciding in time with the trailing flank of the gate pulse.

References Cited by the Examiner
UNITED STATES PATENTS

| | | | |
|---|---|---|---|
| 3,085,243 | 4/1963 | Bond | 343—7.3 |
| 3,117,315 | 1/1964 | Engholm et al. | 343—7.3 |
| 3,158,751 | 11/1964 | Nelson | 307—88.5 |

JOHN W. HUCKERT, *Primary Examiner.*

CHESTER L. JUSTUS, ARTHUR GAUSS, *Examiners.*

E. T. S. CHUNG, J. S. HEYMAN, *Assistant Examiners.*